United States Patent [19]
Nagahiro et al.

[11] 3,984,067
[45] Oct. 5, 1976

[54] AUTOMATIC TAPE WINDING DEVICE

[75] Inventors: Michinori Nagahiro, Nishinomiya; Yoshinobu Nakata, Osaka; Hiroo Hosono, Hirakata, all of Japan

[73] Assignee: Matsushita Electric Industrial Co., Ltd., Osaka, Japan

[22] Filed: Oct. 13, 1972

[21] Appl. No.: 297,190

[30] Foreign Application Priority Data
Oct. 15, 1971  Japan.............................. 46-81995
June 16, 1972  Japan.............................. 47-60779

[52] U.S. Cl.............................. 242/210; 352/158
[51] Int. Cl.²............... B65H 75/34; G03B 1/04; G11B 15/60
[58] Field of Search .......... 242/210, 195, 187, 71.1, 242/74; 352/158, 157

[56] References Cited
UNITED STATES PATENTS

| | | | |
|---|---|---|---|
| 3,282,521 | 11/1966 | Schuller et al..................... | 242/210 |
| 3,395,870 | 8/1968 | Klinger ............................... | 242/187 |
| 3,544,040 | 12/1970 | Bundschuh ......................... | 242/210 |
| 3,606,192 | 9/1971 | Goddard.............................. | 242/187 |
| 3,643,893 | 2/1972 | Neff..................................... | 242/195 |
| 3,740,001 | 6/1973 | Wroblewski ....................... | 242/195 |

FOREIGN PATENTS OR APPLICATIONS
460,622  6/1928  Germany ............... 242/210

*Primary Examiner*—Leonard D. Christian
*Attorney, Agent, or Firm*—Stevens, Davis, Miller & Mosher

[57] ABSTRACT

An automatic tape winding device in which the leading end portion of a tape-like article inserted into the device is pressed against a portion of a reel hub rotating at a peripheral speed higher than the speed of said tape-like article and, upon passage of the point of pressure contact of said tape-like article with said reel hub, is again led to said point of pressure contact, and such operation is repeated, whereby said leading end portion of the tape-like article is automatically engaged with said reel hub.

8 Claims, 10 Drawing Figures

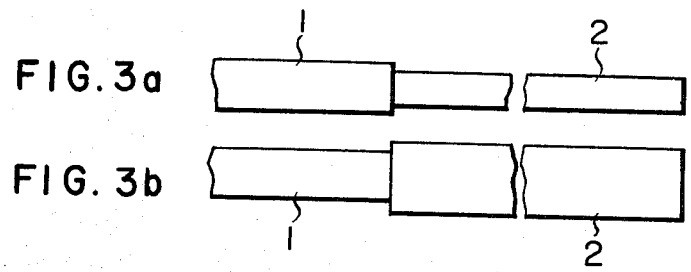
FIG. 3a
FIG. 3b
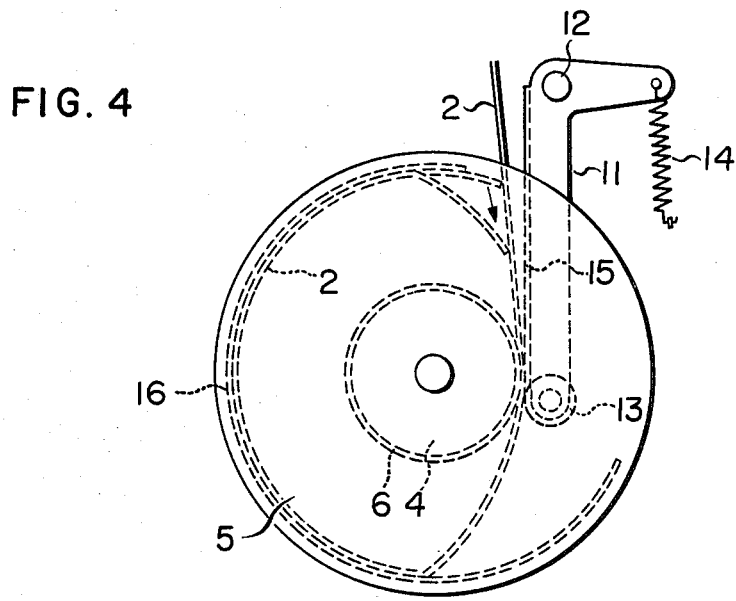
FIG. 4

AUTOMATIC TAPE WINDING DEVICE

This invention relates to a winding device for winding tape-like articles, such as a magnetic tape for use in a magnetic tape recording and reproducing apparatus, which is so designed that the leading end portion of a tape inserted into the device is automatically lapped around a winding reel.

An automatic type winding device of this type is shown in U.S. Pat. No. 3,330,496. It is so constructed that the leading end portion of a tape-like article is pressed against a reel hub by an elastic element in the widthwise direction of said article, whereby said leading end portion of the tape-like article is secured to said reel hub by mechanical engagement with said elastic element.

Such a construction, however, has had the disadvantages that the reel becomes complicated in construction per se because of the elastic element or the like, and that repeated use of the tape-like article results in breakage of the edges of the leading end portion of said tape-like article.

An object of the present invention, therefore, is to provide a winding apparatus so designed that the leading end portion of a tape-like article to be wound can be automatically lapped around a hub of a winding reel, without using an elastic element for pressing said leading end portion in the widthwise direction.

Another object of the invention is to provide a winding device of the character described above, in which the leading end portion of the tape-like article, after having been secured to the winding reel, will not interfere with the successive winding operation.

Other objects of the invention will become apparent from the following description on practical embodiments of the invention:

FIGS. 1, 4 and 5 are plan views for explaining the construction and operation of one embodiment of the invention;

Figure 8A:
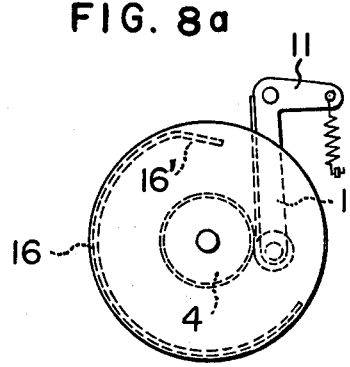
Figure 8B:
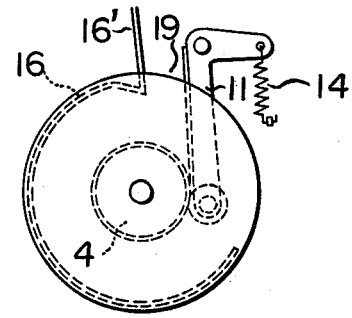
Figure 6:
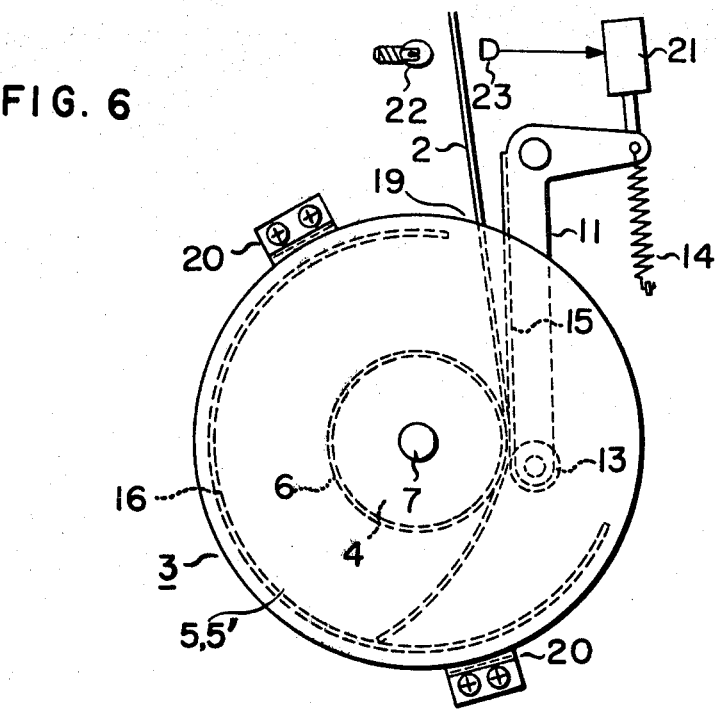
Figure 7:

FIGS. 3(a) and 3(b) are plan views showing different types of a leader tape respectively;

FIG. 6 is a plan view showing another embodiment of the invention;

FIG. 7 is a perspective view of the essential portion of the embodiment shown in FIG. 6; and FIGS. 8(a) and 8(b) are plan views respectively showing still other embodiments of the invention.

Embodiments of the invention will be described hereunder with reference to the drawings:

In the embodiment shown in FIGS. 1 - 5, reference numeral 1 designates a tape to be wound, and 2 designates a leader tape having a suitable regidity, which is connected to the leading end of the tape as shown in FIG. 3(a) or 3(b).

A winding reel 3 comprises an upper flange 5, a lower flange 5' and a reel hub 4 having an annular friction member 6 fitted around the outer peripheral surface thereof, said annular friction member 6 being made of a material having a large coefficient of friction, such as rubber. This winding reel 3 is driven about a spindle 7 through a slip mechanism.

Namely, a winding reel pulley 8 is driven about the spindle 7 by a winding reel drive wheel 9 and the winding reel 3 is driven by said winding reel pulley 8, through a friction member 10 such as felt provided on the upper surface of said winding reel pulley 8, at a speed higher than the tape running speed at the start of the winding operation. A generally L-shaped pusher lever 11 is pivotably mounted at its bend on a pivot pin 12, with one arm thereof extending into the space formed between the flanges 5, 5' of the winding reel 3. The pusher lever 11 has a roller 13 rotatably mounted at one end adjacent the reel hub 4 and is urged to rotate in a clockwise direction by a spring 14 anchored to the other end thereof. Thus, it will be understood that the roller 13 is held in pressure contact with the friction member 6 provided around the outer peripheral surface of the reel hub 4. The edge, on the side adjacent the reel hub 4, of the roller carrying arm of the pusher lever 11 is bent perpendicularly to form a tape guide surface 15.

Figure 1:
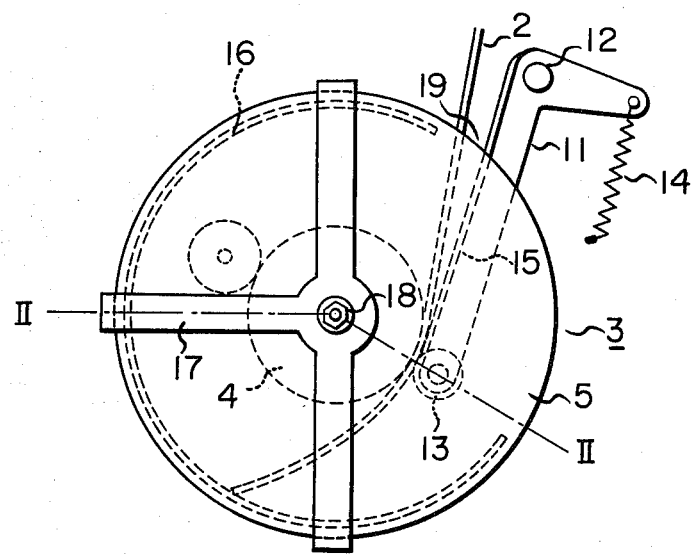
Figure 2:
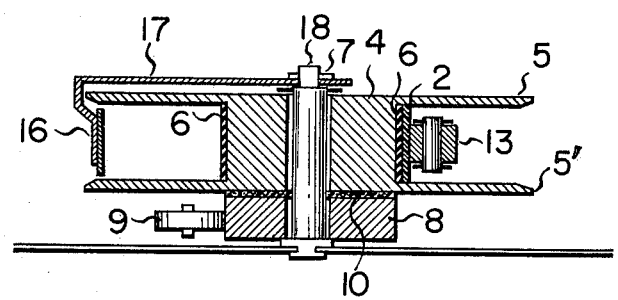
FIG. 2 is a sectional view along the line II—II of FIG. 1.

A guide member 16 has a shape which constitutes a portion of a circle of a diameter slightly smaller than the diameter of the flanges 5, 5' and has a width smaller than the interval between the flanges 5, 5'. This guide member 16 is arranged between the flanges 5, 5' concentrically therewith and held in position by a substantially T-shaped supporting member 17, as shown in FIGS. 1 and 2.

The supporting member 17 is removably mounted on a shoulder formed at the top end portion of the spindle 7 and secured thereto by a screw 18. The arcuate guide member 16 has one end located adjacent the point of pressure contact between the roller 13 and the hub 4, and extends along the periphery of the reel on the opposite side of the pusher lever 11 with respect to the hub 4, with the other end thereof located at a point a suitable distance spaced from the tape guide surface 15 of the pusher lever 11. More exactly, the arcuate length and position of the guide member 16 are determined so as to facilitate the operation to be described later. Further, the diameter of the guide member 16 is determined in consideration of the possible maximum diameter of the tape winding formed in the winding reel.

The leader tape 2 is inserted into the nip of the roller 13 and friction member 6, through the tape entrance 19 formed between the tape guide surface 15 and the other end of the guide member 16, by a known mechanism operable by taking advantage of the rigidity of said leader tape, though not apparent in the drawings. In this case, the speed $V_t$ of the tape is set so as to be sufficiently lower than the peripheral speed $V_h$ of the rotating reel hub 4.

Now, the operation of the automatic tape winding device constructed as described above will be described:

First of all, the leader tape 2 inserted into the nip of the roller 13 and friction member 6 in the manner described above is urged against the friction member 6 under the pressure exerted thereon by said roller 13 and receives the driving force of the winding reel 3 due to the friction between it and said friction member 6, and the speed difference between the tape feeding speed $V_t$ and the peripheral speed $V_h$ of the reel hub 4.

However, because of the facts that the leader tape 2 travels in its taut state and that the winding reel 3 is driven through the slip mechanism, the speed of the tape does not change, the tension only being increased in the leader tape 2 to a degree not detrimental to the winding operation.

Figure 5:
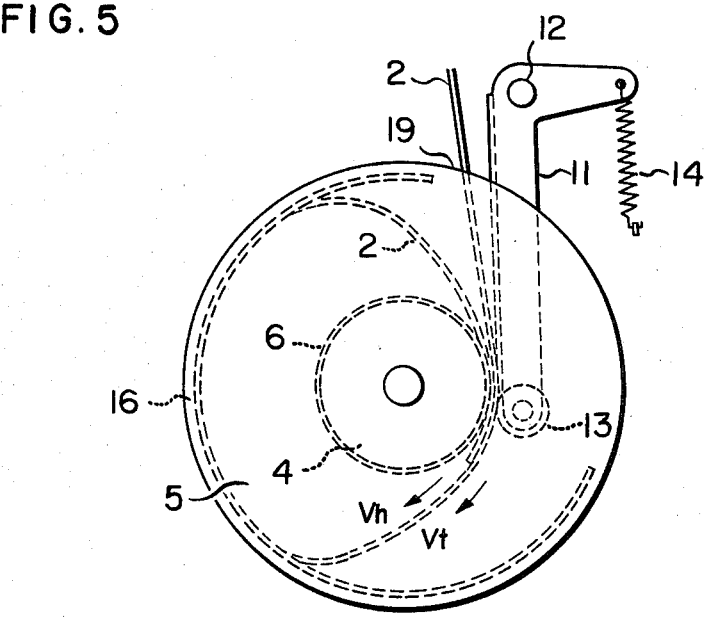

After passing the point of pressure contact effected by the roller 13, the leader tape abuts against the arcuate guide member 16 at its leading end due to the rigidity thereof, and is bent in a direction to be lapped around the reel hub 4 as shown in FIG. 1. Thus, the leading end of the leader tape 2 travels around the reel hub 4 while sliding on the inner surface of the arcuate guide member 16, and abuts against the successive portion of the leader tape 2 at the tape entrance 19 as shown in FIG. 4. Successively thereafter, the leading end of the leader tape 2 is led into the nip between the successive portion of said leader tape and the friction member 6, as shown in FIG. 5, by the frictional engagement between it and said successive portion of the leader tape. Therefore, the leading end portion of the leader tape 2 again receives the driving force of the winding reel 3 through the friction member 6. In this case, however, the leading end portion of the leader tape 2 is driven at a speed equal to the peripheral speed $V_h$ of the reel hub 4 because it is followed by the slackened loop and because the friction between the portions of the leader tape 2 is much smaller than that between the leader tape 2 and the friction member 6.

Thus, the leading end portion of the leader tape or the inner one of the two loops of the leader tape formed around the reel hub 4 is driven at a speed higher than the speed of the successive portion of said leader tape, and finally the portion of the leader tape trailed around the reel hub 4 is tightly wound up on said hub. The leading end portion of the leader tape 2 again passes the point of pressure contact of the roller 13, forming an additional turn around the reel hub 4. In the manner described, the entire leader tape 2 is tightly lapped around the reel hub, and thereafter, normal tape winding operation takes place.

According to the automatic tape winding device of the construction described above, automatic tape winding can be achieved reliably without causing a damage to the tape.

Further, according to the construction described above, since the arcuate guide member 16 is supported from the upper side by the supporting member 17 mounted on the top end of the reel spindle, the assembly of the winding device is easy and the positional relation between the pusher lever 11 and the guide member 16 can be easily adjusted, simply by rotating said supporting member 17. It should be noted, however, that the guide member 16 may be fixedly secured to a base plate (not shown) by means of joggled fittings 20 as shown in FIGS. 6 and 7.

Another embodiment of the invention is shown in FIG. 6. In this embodiment, pusher lever driving means, such as a plunger 21, is connected to one end of the pusher lever 11, so as to cause forcibly said pusher lever 11 to make a pivotal movement in a counterclockwise direction against the biasing force of the spring 14 as the occasion demands, and the leader tape 2 is made of a transparent material. Further, a light source 22 and a photo-electric converter element 23 are provided in opposed relation to each other on both sides of the travelling path of a tape to be wound up. According to this embodiment, the termination of the leader tape winding operation and the start of the normal tape winding operation are detected by the photoelectric converter element 23 which receives the light from the light source 22 through the transparent tape, and the plunger 21 is actuated in response to a signal from said photo-electric converter element, whereby the roller 13 at one end of the pusher lever 11 is disengaged from the leader tape wound on the reel hub 4. It will be obvious that the length of the leader tape in this case must be long enough for said leader tape to be securely engaged with the winding reel.

It is also possible to arrange the apparatus such that the plunger 21 may automatically be actuated, with a predetermined time lag subsequent to the commencement of tape feeding operation, by a delay relay which is operatively associated with a tape feeding mechanism.

Turning now to FIGS. 8(a) and 8(b), there are shown still other embodiments of the invention. In the embodiment shown in FIG. 8(a), the end 16' of the guide member 16 adjacent the tape guide surface of the pusher lever 11 is bent inwardly so that a leader tape of a small rigidity may even be lapped around the reel hub positively. In the embodiment shown in FIG. 8(b), the same end 16' of the guide member 16 as mentioned above with reference to FIG. 8(a) is extended further and bent outwardly to guide the tape at the tape entrance 19. The other construction and operation of these embodiments are the same as those of the first embodiment.

As described herein, the automatic winding device according to the present invention comprises means for pressing a leader tape against the outer peripheral surface of a hub of a winding reel and means for guiding the leading end portion of the leader tape fed into the winding reel to form a loop around the reel hub and then abut against the successive portion thereof to be led into between said successive portion and said reel hub, and is so designed that the peripheral speed of said reel hub may become higher than the tape feeding speed, whereby the inner one of the juxtaposed layers of the leader tape is driven at a faster speed than the outer layer and thus the leader tape is automatically lapped around the reel hub. The device of the invention is highly adapted for automatic winding of tapes, owing to the simplicity of construction, and high reliability and safety of operation.

As may be understood from the foregoing description, the width of the leader tape 2 may be optional, provided that it is smaller than the interval between the upper and lower flanges 5, 5'. It will also be understood that the leader tape 2 is not always necessary if the tape 1 to be wound has a suitable rigidity. Further, the friction member 6 need not always be provided as an independent annular element, if it can be provided on the peripheral surface of the reel hub 4 integrally therewith.

It is also to be understood that the roller 13 is not always necessary but may be substituted by the side surface of the pusher lever 11, which is shaped into a suitable configuration.

What is claimed is:

1. An automatic tape winding device comprising
   a. a winding reel having a hub and flanges, said flanges being secured to opposed ends of the reel hub,
   b. a layer of friction material provided on the outer periphery of said hub,
   c. a ring shaped guide member having a diameter slightly smaller than that of the flanges, said guide member having both ends defining a cutout portion therebetween and positioned concentrically with said reel hub between said flanges along the outer periphery of these flanges in non-contact with the flanges and the hub,
   d. a single pusher lever having a pivot point thereof outside said flanges, one end of said pusher lever being inserted into a space formed between said flanges through said cutout portion, a tape entrance clearance being defined between said pusher lever and one of said ends defining the cutout portion, e. means for urging the leading end of said pusher lever inserted into said space formed between the flanges against said reel hub, f. means for rotating said winding reel at least at the start of the winding operation in such a manner that the peripheral speed of said reel hub becomes higher than the feeding speed of a tape to be wound, and g. guide means for guiding the leading end of said tape to be wound to the point of pressure contact between said pusher lever and said reel hub through said tape entrance.

2. An automatic tape winding device as defined in claim 1, wherein the leading end of said pusher lever comprises a rotatably mounted roller.

3. An automatic tape winding device as defined in claim 1, wherein said device also comprises means for disengaging said pusher lever from the reel hub against said urging means after the leading end of the tape has been lapped around said reel hub.

4. An automatic tape winding device as defined in claim 1, wherein said one end defining the tape entrance clearance is bent inwardly in the radial direction of said winding reel.

5. An automatic tape winding device as defined in claim 1, wherein said guide member is supported by and adjustable by an arm pivotable around the axis of rotation of said winding reel.

6. An automatic tape winding device for winding an elongated tape having a relatively stiff end portion comprising a reel having a hub and two opposed flanges for receiving an elongated tape wound on said hub, a first tape guide, means pivotally mounting said first guide to pivot from a point displaced from said reel, means biasing said first guide against said hub of said reel, a second tape guide, said second guide being fixed in position at the outer periphery of said reel and extending a distance around and spaced from said hub, wherein said first and second guides are so constructed and arranged that a relatively stiff end portion of an elongated tape is directed against said hub by said first guide and hence around the hub by said second guide, and means for driving said reel in a winding direction to rotate said hub at a peripheral velocity which is greater than the feeding velocity of the tape to be wound.

7. An automatic tape winding device as defined in claim 6 comprising further means for moving said first guide from against said hub to a position displaced from said reel after the relatively stiff end portion of a tape is cinched around said hub.

8. An automatic tape winding device as defined in claim 6 wherein said hub of said reel has a friction surface.

* * * * *